United States Patent
Doose et al.

(10) Patent No.: US 8,005,206 B1
(45) Date of Patent: Aug. 23, 2011

(54) VDSL SPLITTER

(75) Inventors: Nathan G. Doose, Ghent, MN (US);
John E. DeCramer, Marshall, MN (US)

(73) Assignee: BH Electronics, Inc., Burnsville, MN (US)

( * ) Notice: Subject to any disclaimer, the term of this patent is extended or adjusted under 35 U.S.C. 154(b) by 1184 days.

(21) Appl. No.: 11/691,441

(22) Filed: Mar. 26, 2007

Related U.S. Application Data

(60) Provisional application No. 60/895,016, filed on Mar. 15, 2007.

(51) Int. Cl.
*H04M 1/00* (2006.01)
*H04M 9/00* (2006.01)

(52) U.S. Cl. .......... 379/413.04; 379/413.02; 379/413.03

(58) Field of Classification Search ............. 379/413.02, 379/413.03, 413.04
See application file for complete search history.

(56) References Cited

U.S. PATENT DOCUMENTS

| | | | |
|---|---|---|---|
| 4,003,005 A | 1/1977 | Mukherjee et al. | |
| 4,443,662 A | 4/1984 | Nakhla | |
| 5,495,212 A | 2/1996 | DeCramer | |
| 5,757,803 A * | 5/1998 | Russell et al. | 370/494 |
| 5,930,340 A | 7/1999 | Bell | |
| 6,100,772 A | 8/2000 | DeCramer et al. | |
| 6,115,466 A | 9/2000 | Bella | |
| 6,118,354 A | 9/2000 | DeCramer et al. | |
| 6,137,866 A | 10/2000 | Staber et al. | |
| 6,144,734 A | 11/2000 | Beeman | |
| 6,285,754 B1 | 9/2001 | Sun et al. | |
| 6,314,102 B1 | 11/2001 | Czerwiec et al. | |
| 6,430,288 B1 | 8/2002 | Frazier et al. | |
| 6,574,236 B1 | 6/2003 | Gosselin et al. | |
| 6,574,647 B1 | 6/2003 | Pfeiffer et al. | |
| 6,718,020 B2 | 4/2004 | Caldera et al. | |
| 6,895,089 B2 | 5/2005 | Wang | |
| 6,980,645 B1 | 12/2005 | Rahyer et al. | |
| 6,998,964 B2 | 2/2006 | Lomax, Jr. et al. | |
| 7,035,380 B1 | 4/2006 | Bingel et al. | |
| 7,057,486 B2 | 6/2006 | Kiko | |
| 7,068,682 B2 | 6/2006 | Campbell et al. | |
| 7,103,150 B2 | 9/2006 | Witty et al. | |
| 7,109,837 B2 | 9/2006 | Watts et al. | |
| 7,164,708 B1 | 1/2007 | Hauptmann et al. | |

(Continued)

FOREIGN PATENT DOCUMENTS

KR 0405173 B1 10/2003

(Continued)

*Primary Examiner* — Alexander Jamal

(74) *Attorney, Agent, or Firm* — Patterson Thuente Christensen Pedersen, P.A.

(57) ABSTRACT

A VDSL splitter device adapted to receive a multi-frequency signal that includes a POTS signal portion and a VDSL signal portion and outputs separate POTS and VDSL signals. The VDSL splitter device includes an input port that receives the multi-frequency signal, a POTS output port, and a VDSL output port. The VDSL splitter also includes a POTS signal conditioning network electrically connected to the input port and the POTS output port. The POTS signal conditioning network receives the multi-frequency signal from the input port and outputs the POTS signal at the POTS output port. The VDSL splitter device also includes a VDSL signal conditioning network electrically connected to the input port and the VDSL output port. The VDSL signal conditioning network includes a voltage blocker and a VDSL high-pass filter, and is adapted to receive the multi-frequency signal from the input port and outputs the VDSL signal at the VDSL output port.

42 Claims, 12 Drawing Sheets

U.S. PATENT DOCUMENTS

| | | | |
|---|---|---|---|
| 2002/0041676 A1 | 4/2002 | DeCramer et al. | |
| 2003/0112960 A1* | 6/2003 | Wang | 379/387.02 |
| 2006/0225119 A1* | 10/2006 | Wollmershauser et al. | 725/121 |
| 2008/0074178 A1* | 3/2008 | Op De Beeck | 327/558 |
| 2008/0151929 A1* | 6/2008 | Uhlemann | 370/463 |

FOREIGN PATENT DOCUMENTS

| | | |
|---|---|---|
| WO | WO 99/51019 | 10/1999 |
| WO | WO 00/70833 | 11/2000 |
| WO | WO 2006/105534 | 10/2006 |

* cited by examiner

VDSL SPLITTER

RELATED APPLICATION

The present application claims priority to U.S. Provisional Application No. 60/895,016, filed Mar. 15, 2007, and entitled "VDSL SPLITTER," which is incorporated by reference herein in its entirety.

FIELD OF THE INVENTION

The present invention relates to networks with transmission lines that carry both plain old telephone system (POTS) signals and very high speed data subscriber line (VDSL) signals over a common transmission line. More particularly, this present invention relates to a device for splitting the combined POTS and VDSL signal into individual signals for interference-free distribution at a telephone customer premise.

BACKGROUND OF THE INVENTION

The plain old telephone service, or POTS, is the service that delivers analog voice signals to a customer's home or office. These analog voice signals are generally transmitted at a frequency of less than 4 kHz via twisted pairs of copper wires. These same twisted pairs of wires often carry digital signals at significantly higher frequencies. For example, a twisted-pair wire may carry a very high digital subscriber line (VDSL) signal operating in the range of 25 kHz to 8.5 MHz, and above.

When such an incoming signal is received at a customer premise, it must be split into separate low- and high-frequency signals. The low-frequency analog signals will be distributed through the location's telephone network across unshielded twisted-pair wires, with the high-frequency signal sent to a gateway device for distribution to local devices such as personal computers, set-top boxes, and so on. The VDSL signal may be distributed across a 100 ohm VDSL twisted pair network within the customer premise, or in other cases may need to be distributed across a 75 ohm coaxial cable network. Either way, separation of signals must be accomplished without introducing unwanted interference into the digital signal.

Interference may be introduced into the VDSL signal from a number of sources. The low-frequency POTS signal may create transient interference signals during operation, for example, during on-hook, off-hook, and ringing. Other outside sources, including sources at a customer location or premise, or from a central office, may introduce electromagnetic interference or other types of interference into the VDSL signal.

Such interference must be prevented from being introduced into the VDSL signal, or removed from the signal, without significant data loss. This becomes especially true for video signals, a critical component of VDSL signals.

A number of splitter devices for interfacing customer premise equipment to the telephone network are already known in the industry. Many of these known splitter devices tend to incorporate extensive electronic schemes that include frequency splitters, multiple low-pass, high-pass, and band-pass filters, along with other active electronic devices. However, these known devices still often fail to satisfactorily eliminate transient signals introduced into the VDSL signals from the POTS circuit operation, especially in the higher frequency ranges. Furthermore, these devices tend to be sensitive to environmental changes, less robust, and sometimes more expensive than simpler analog devices.

On the other hand, industry has often slimmed analog splitters and filters as lacking the performance required for conditioning today's higher-and-higher frequency DSL signals. Analog filters with passive elements that are able achieve the steep roll-off characteristics necessary to separate voice and data signals require the use of higher-order filters. However, such higher-order filters tend to be complex, difficult to design, and relatively expensive due to the use of multiple inductors. Further, such designs tend to be very application specific, and do not always provide an interference free signal without significant data loss.

Therefore, a need exists for a simplistic, yet high performance, splitter device connected to a telephone company network that separates an incoming multi-frequency signal into separate low and high-frequency outputs with minimal distortion and data loss.

SUMMARY OF THE INVENTION

In one embodiment, the present invention is a system and method of receiving a multi-frequency signal from a telephone central office at a customer premise, tapping the multi-frequency signal into multiple multi-frequency signals, filtering the multi-frequency signal into a low-frequency POTS signal and a high-frequency VDSL signal, using multi-stage low-pass and high-pass filters adapted to attenuate specific frequencies, distributing the POTS signal to a premise twisted pair telephone wiring network, and distributing the VDSL signal to one or more premise VDSL devices.

Another embodiment of the present invention is a VDSL splitter located at a telephone customer premise and adapted to receive an incoming multi-frequency signal comprised of a low-frequency POTS signal and a high-frequency VDSL signal, and output separate, POTS and VDSL signals. The VDSL splitter includes an input port, connections for tapping the incoming signal, a POTS signal conditioning network, a VDSL signal conditioning network, and a pair of output ports. The POTS signal conditioning network includes a common mode choke and a multi-stage POTS low-pass filter. The POTS signal conditioning network substantially attenuates high-frequency signal components, allowing the DC to 4 KHz portion of the signal to pass. The VDSL signal conditioning network may include any combination of a voltage blocker, VDSL high-pass filter, and a multi-stage VDSL low-pass filter, attenuating portions of the incoming multi-frequency signal below and above the VDSL frequency range. In one embodiment that includes both a VDSL high-pass filter and a VDSL low-pass filter, the roll-off rate of the VDSL low-pass filter is steeper than the roll-off rate of the VDSL high-pass filter. A pair of output ports couples the POTS signal conditioning network and VDSL signal conditioning network outputs to premise wiring.

Other embodiments of the VDSL signal conditioning network VDSL may not include a voltage blocker, a VDSL high-pass filter, or a VDSL low-pass filter. For example, in one embodiment, the VDSL high-pass filter and VDSL low-pass filters are combined into a single bandpass filter. In another embodiment, the VDSL signal conditioning network may not include a VDSL low-pass filter so as to allow all high-frequency portions of the VDSL signal to pass through the VDSL signal conditioning network, unfiltered.

In some embodiments, the output port is adapted to couple the VDSL output of the VDSL splitter to a Category 5 100 ohm twisted pair of wires.

In other embodiments, the VDSL splitter includes an impedance-matching balun with a center tap connected to ground, converting the 100 ohm balanced signal to a 75 ohm unbalanced signal for connection to a coax cable at a customer premise.

DESCRIPTION OF THE PREFERRED EMBODIMENTS

Figure 1:
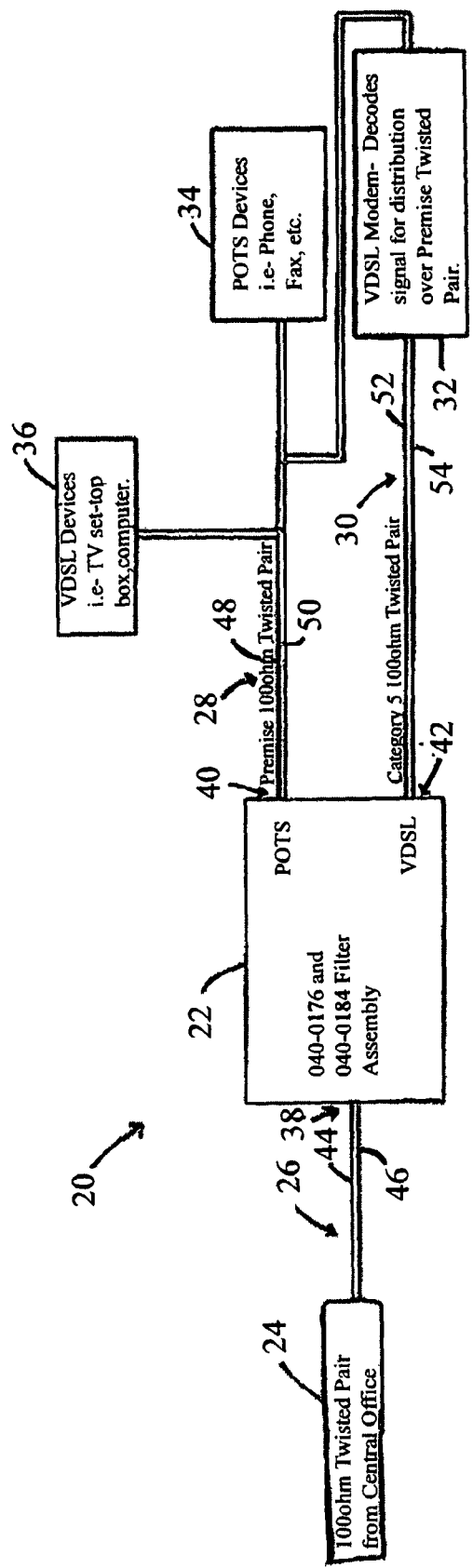
FIG. 1 is a block diagram of one embodiment of a VDSL system of the present invention linking a customer premise to a telephone network, where the VDSL output port is connected to a twisted pair of wires at customer premise.

Referring to FIG. 1, one embodiment of the present invention is a VDSL interface system 20 adapted to transmit VDSL signals across twisted pair wiring within a customer premise. VDSL interface system 20 includes VDSL splitter 22, central office 24, telephone network twisted pair wiring 26, premise twisted pairs 28 and 30, VDSL modem or multiplexor 32, POTS devices 34, and VDSL devices 36. VDSL splitter 22 includes multi-frequency input port 38, POTS output port 40, and VDSL output port 42.

VDSL splitter 22 is connected to central office 24 through telephone network twisted pair wiring 26. Twisted pair wiring 26 typically includes tip line 44 and ring line 46. A multi-frequency signal that includes a low frequency POTS signal and a high-frequency VDSL signal is transmitted across twisted pair 26 and received by VDSL splitter 22 at input port 38.

VDSL splitter 22 separates the incoming multi-frequency signal into separate POTS and VDSL signals which are output at POTS output port 40 and VDSL output port 42, respectively. In one embodiment, VDSL splitter 22 is incorporated into a network interface device (NID) box module located within a telephone company NID box on the side of a building where telephone network twisted pair 26 enters the structure. In another embodiment, VDSL splitter 22 may be located inside a premise. For example, in a multi-unit building, such as an apartment building, multiple VDSL splitters 22 may be located at each unit inside the building. More specifically, a VDSL splitter 22 may be located behind a wall plate in an inside wall of a unit within a multi-unit building.

Premise twisted pair 28, which includes lines 48 and 50, transmits the filtered POTS signal from output port 40 to POTS devices 34. In one embodiment, premise twisted pair 28 is a 100 ohm twisted pair of wires. POTS devices 34 include telephones, fax machines, and other devices that utilize low-frequency telephone signals.

Premise twisted pair 30, which includes lines 52 and 54, transmits the VDSL signal from output port 42 to VDSL modem 32 which decodes the VDSL signal for distribution over premise twisted pair 30 to VDSL devices 36. VDSL devices 36 may include television set-top boxes, computers, and so on. In one embodiment, premise twisted pair 30 is a Category 5 (Cat 5) 100 ohm twisted pair of wires.

Figure 2:
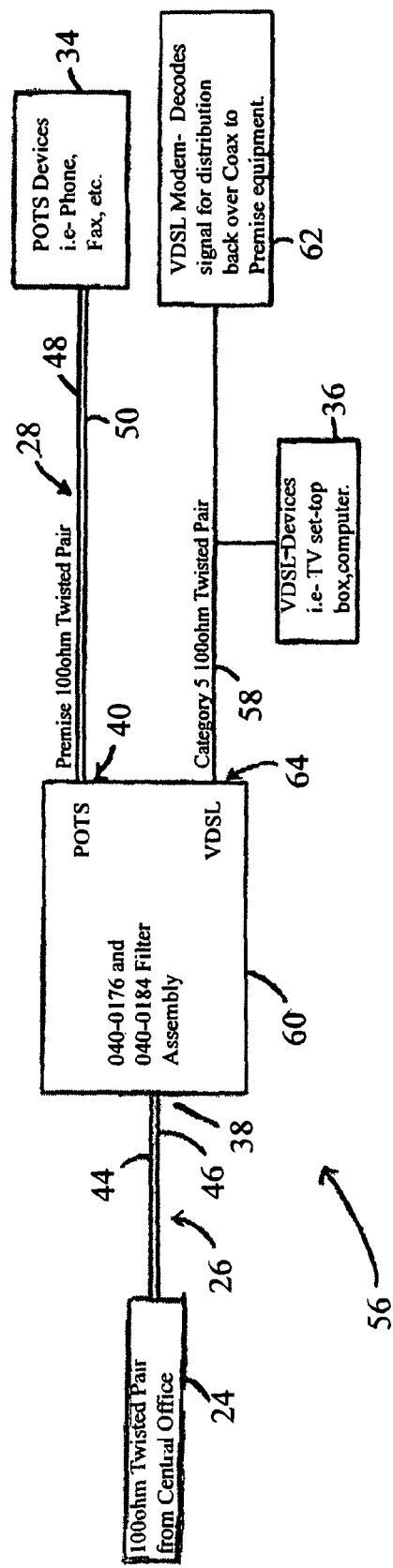
FIG. 2 is a block diagram of another embodiment of a VDSL system of the present invention that links a customer premise to a telephone network, where the VDSL output port is connected to a coax cable at a customer premise.

Referring to FIG. 2, another embodiment of the present invention is a VDSL system 56, adapted to transmit VDSL signals across a coax cable 58 within a customer premise. VDSL interface system 56 includes VDSL splitter 60, central office 24, telephone network twisted pair wiring 26, premise twisted pair 28, premise coax cable 58, VDSL modem 62, POTS devices 34, and VDSL devices 36. VDSL splitter 60 includes input port 38, POTS output port 40, and VDSL coax output port 64.

As in the previous embodiment, VDSL splitter 60 is connected to central office 24 through telephone network twisted pair wiring 26. A multi-frequency signal that includes a low frequency POTS signal and a high-frequency VDSL signal is transmitted across twisted pair 26 and received by VDSL splitter 60 at input port 38. VDSL splitter 60 separates the incoming multi-frequency signal into separate POTS and VDSL signals which are output at POTS output 40 and VDSL coax output 64, respectively. In one embodiment, VDSL splitter 60 is incorporated into a NID box located on the side of the premise, and VDSL coax output 64 may be an "F" connector.

Premise twisted pair 28, which includes lines 48 and 50, transmits the filtered POTS signal from output 40 to POTS devices 34. In one embodiment, premise twisted pair 28 is a 100 ohm twisted pair of wires.

In one embodiment, coax cable 58 transmits the VDSL signal from VDSL coax output 64 to VDSL modem 62 which decodes the VDSL signal for distribution back over coax cable 58 to VDSL devices 36.

Figure 3:
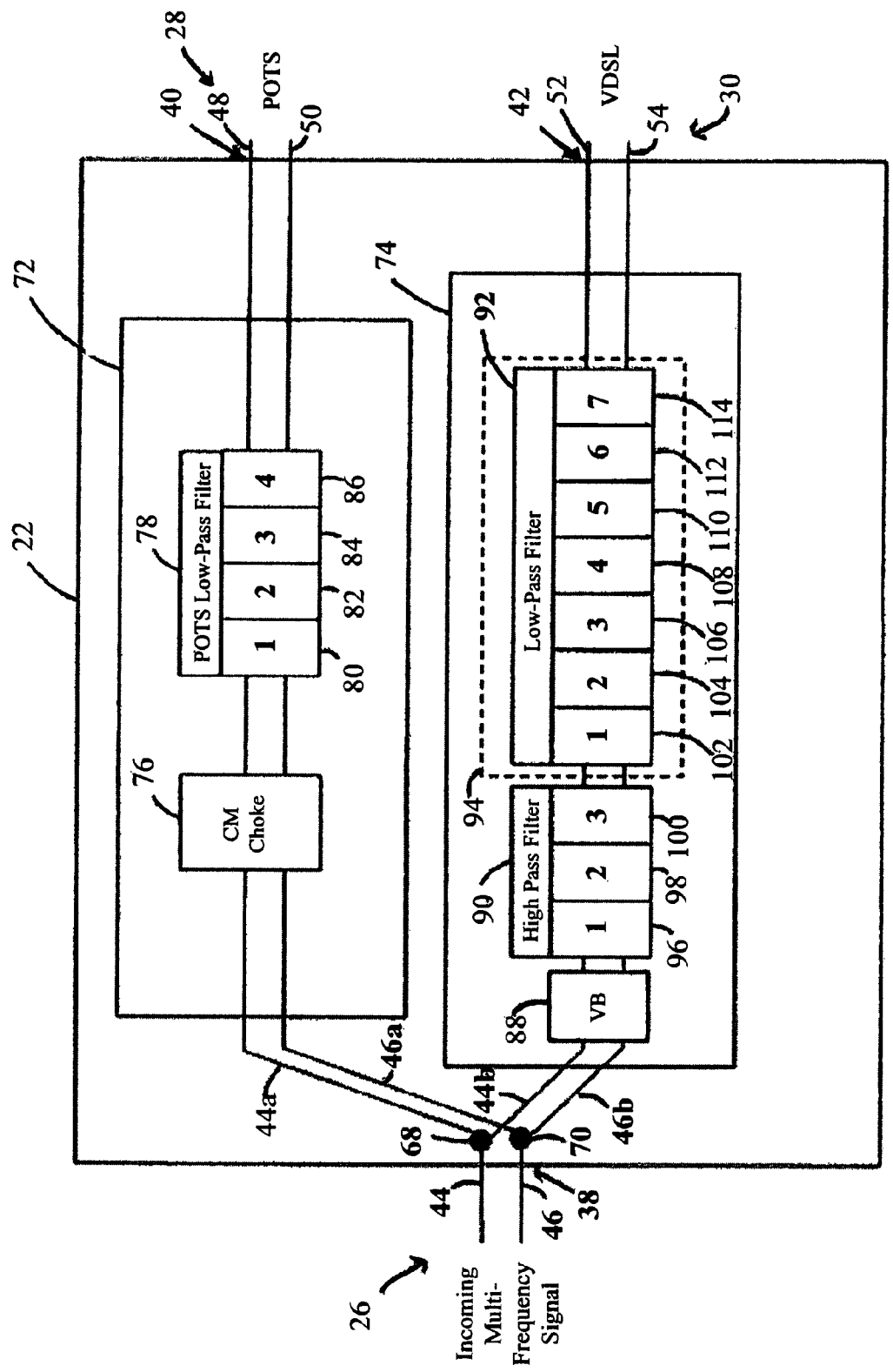
FIG. 3 is a block diagram of one embodiment of a VDSL splitter device of the present invention configured for use with twisted pair wiring at the customer premise.

As depicted in the block diagram of FIG. 3, in addition to input port 38 and output ports 40 and 42, VDSL splitter 22 also includes connectors 68 and 70, POTS signal conditioning network 72 and VDSL signal conditioning network 74.

In this embodiment, POTS signal conditioning network 72 includes a common-mode choke 76 and POTS low-pass filter 78. POTS low-pass filter 78 may be a multi-pole, high-order filter, with single or multiple filter stages. In the embodiment depicted in FIG. 3, POTS low-pass filter 78 is a fourth-order filter that includes four stages, 80 through 86.

VDSL signal conditioning network 74 may include a voltage blocker 88, a VDSL high-pass filter, a VDSL low-pass filter, or any combination thereof. In one embodiment, VDSL signal conditioning network 74 includes voltage blocker 88 VDSL high-pass filter 90, VDSL low-pass filter 92, and electromagnetic shield 94.

VDSL high-pass filter 90 may be a multi-pole, or high-order filter, with multiple filter stages, and may be located between voltage blocker 88 and VDSL low-pass filter 92. In the embodiment depicted in FIG. 3, VDSL high-pass filter 90 is a third-order high-pass filter that includes, first stage 96, second stage 98, and third stage 100. In other embodiments, VDSL high-pass filter 90 may include fewer or more filter stages, or may be eliminated altogether from VDSL signal conditioning network 74.

In one embodiment, VDSL low-pass filter 92 is a multi-pole, or high-order filter, with multiple filter stages. In the embodiment depicted in FIG. 3, VDSL low-pass filter 92 is a seventh-order low-pass filter and includes seven stages, 102 through 114. Other embodiments of VDSL low-pass filter 92 may include fewer or more filter stages, thereby affecting the frequency limits of the pass band, the roll-off, and other characteristics of VDSL low-pass filter 92. For example, reducing and increasing the number of filter stages will respectively increase and decrease the rate of roll-off.

In other embodiments, VDSL high-pass filter 90 and VDSL low-pass filter 92 may be combined into a single bandpass filter, rather than separate low-pass and high-pass filters.

In yet another embodiment, VDSL high-pass filter 90 may not be included in VDSL signal conditioning network 74. For example, in some circumstances, it may be desirable to allow all portions of the multi-frequency signal in the pass band of VDSL high-pass filter to be included in the VDSL signal at the VDSL output port.

Electromagnetic shield 94 may encompass only VDSL low-pass filter 92, as depicted in FIG. 3, but may also encompass high-pass filter 90, voltage blocker 88, and other components.

Still referring to the embodiment depicted in FIG. 3, tip line 44 is tapped at connector 68 into signal lines 44a and 44b, while ring line 46 is tapped at connector 70 into signal lines 46a and 46b. As such, the complete incoming multi-frequency signal received at input port 38 is routed to both POTS signal conditioning network 72 and VDSL signal conditioning network 74.

As will be described in further detail below, the frequency split of the incoming multi-frequency signal into its POTS and VDSL components is accomplished by passing the incoming multi-frequency signal through the distinctive and separate signal conditioning networks, POTS signal conditioning network 72 and VDSL signal conditioning network 74. With respect to the POTS signal, RF interference and the high-frequency portion of the incoming multi-frequency signal are removed by the POTS signal conditioning network 72, leaving a resultant POTS low-frequency signal available at output port 40. With respect to the VDSL signal, DC voltage is blocked, then those portions of the incoming multi-frequency signal above and below the VDSL range of frequencies are attenuated by VDSL signal conditioning network 74.

Figure 4:
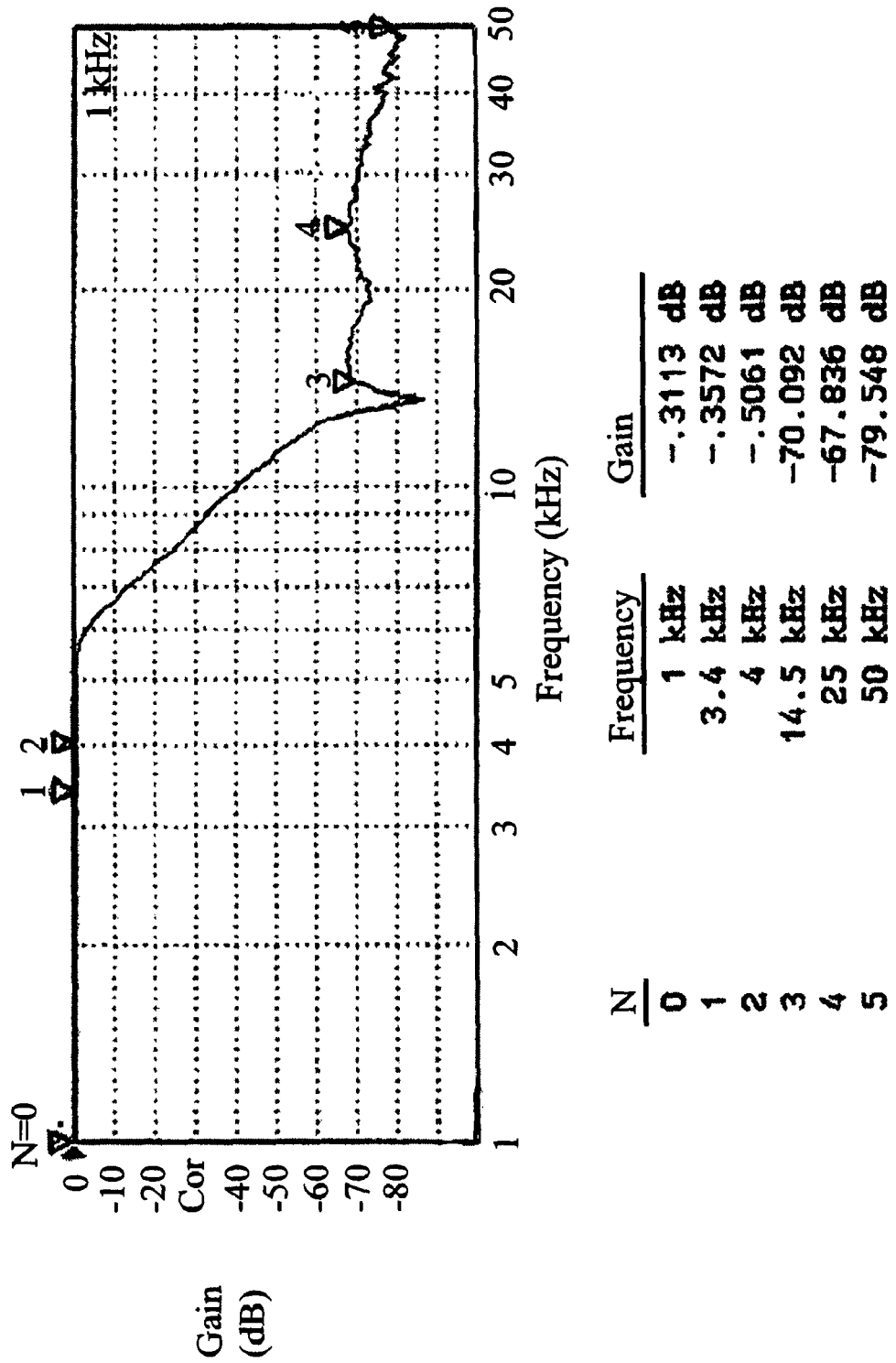
FIG. 4 is a Bode plot of one embodiment of a POTS low-pass filter of the splitter device of the present invention.

Referring to FIG. 4, the performance of one embodiment of a POTS signal conditioning network 72 is illustrated graphically in a Bode plot of gain (x-axis) vs. frequency (y-axis). POTS signal conditioning network 72 allows the low-frequency portion of the signal to pass through with minimal attenuation. As illustrated in FIG. 4, in one embodiment, POTS signal conditioning network 72 allows DC to 4 KHz portions of the incoming signal to pass through to the premise POTS network without signal attenuation, while greatly attenuating the higher-frequency VDSL signal. In other embodiments, the pass band characteristics of POTS signal conditioning network 72 may be adjusted to allow portions of the multi-frequency signal with frequencies above or below 4 kHz to be included in the POTS signal at the POTS output port.

Figure 5:
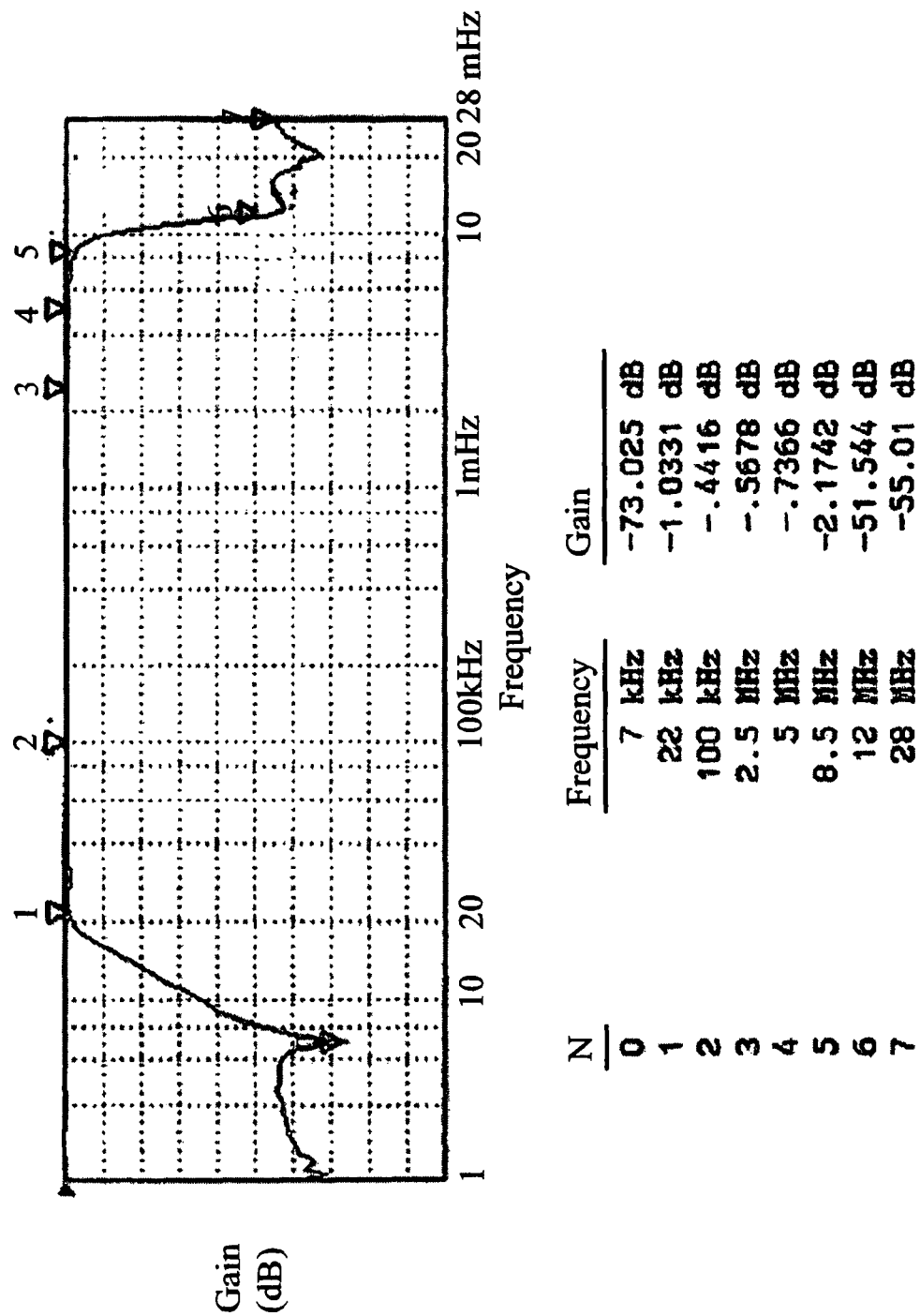
FIG. 5 is a Bode plot of one embodiment of a VDSL signal conditioning network of the splitter device of the present invention.

Referring now to FIG. 5, the performance of one embodiment of VDSL signal conditioning network 74 is illustrated graphically in a Bode plot of gain (x-axis) vs. frequency (y-axis). Contrary to POTS signal conditioning network 72, this embodiment of VDSL signal conditioning network 74 greatly attenuates the low-frequency POTS signal, via voltage blocker 88 and VDSL high-pass filter 90, while providing minimal attenuation to VDSL frequency signals. In the embodiment depicted in FIG. 5, VDSL signal conditioning network 74 provides minimal attenuation to the 25 KHz to 8.5 MHz VDSL signal, yet provides high attenuation above 8.5 MHz.

In other embodiments, the pass band characteristics of VDSL high-pass filter 90 may be such that roll-off occurs above or below 8.5 MHZ, depending on the desired characteristics of the delivered VDSL signal.

It is critical to circuit performance that the VDSL signals be as free from interference as possible and deliver the maximum data rate to VDSL devices 36. This remains especially true of video signals. Interference may be introduced into the sensitive VDSL low-pass filter 92 of VDSL splitter 22 from the POTS circuit itself, and from outside sources, including sources within the customer premise.

To achieve this particular signal quality, specific attenuation levels at specific frequencies are defined for POTS low-pass filter 78, and each of the components of VDSL signal conditioning network 74. Referring again to FIG. 4, in one embodiment, POTS signal conditioning network 72 provides a critical attenuation of greater than 60 dB from 14.5 KHz to at least 25 KHz. The relatively steep 14.5 KHz low-pass filter roll-off seen from Points 2 to 3 is extremely important to signal performance. Referring again to FIG. 5, in one embodiment, VDSL signal conditioning network 74 provides an attenuation of greater than 50 dB from 200 Hz to 7.5 KHz. A combination of these circuit performances greatly reduces VDSL data loss caused by transient signals created by POTS circuit operations such as on-hook, off-hook, and ringing instances.

Further, a signal attenuation of greater than 40 dB from 12 MHz to 28 MHz, as provided in one embodiment of VDSL signal conditioning network 74, greatly reduces VDSL packet loss caused by a home network (HPNA) which may coexist on the same medium.

In one embodiment, the roll-off characteristics of VDSL high-pass filter 90 and the roll-off characteristics of VDSL low-pass filter 92 may not be symmetrical. For example, the roll-off characteristics of VDSL high-pass filter 90 as illustrated in FIG. 5 exhibit a −73 dB gain at 7 kHz, rising to an approximately −1 dB gain at 22 kHz. On the other hand, VDSL low-pass filter 92 exhibits much steeper roll-off. For example, only −2 dB of attenuation is seen at 8.5 mHz, yet at 12 mHz, the signal is attenuated by approximately −51 dB.

This asymmetrical signal conditioning strikes a balance between performance and cost. Although a higher-order filter with an increased number of stages provides the desirable steep roll-off, unwanted ripple may be introduced into the system, and costs generally rise. On the other hand, less-steep roll-off characteristics may not provide the attenuation required to transmit an interference-free VDSL signal with minimal data loss. Known bandpass filters used in prior art VDSL splitters attempt to find a balance between performance and cost with varying degrees of success. However, bandpass filters yield substantially symmetrical roll-off characteristics at the edges of the pass band.

Conversely, the asymmetrical properties of the VDSL signal conditioning network 74 provide sharp roll-off with acceptable ripple at the high-frequency transition from pass band to stop band. At the same time, network 74 allows for less-sharp roll-off at the low-frequency edge of the VDSL spectrum at a significant component cost savings.

Figure 6:
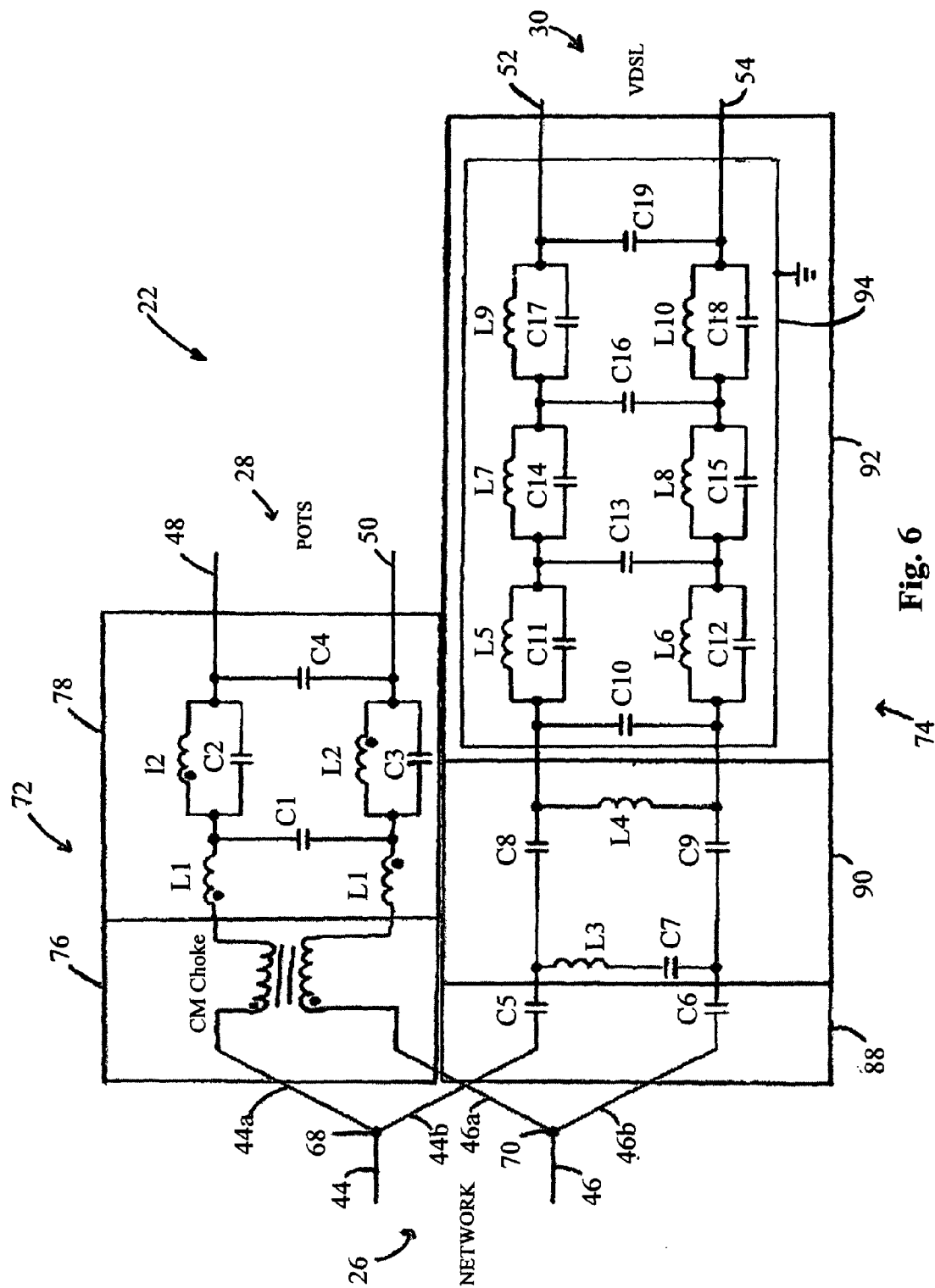
FIG. 6 is a circuit diagram of one embodiment of a VDSL splitter device of the present invention configured for use with twisted pair wiring at the customer premise.

FIG. 6 depicts one embodiment of an electrical circuit of VDSL splitter 22, designed to achieve the specific performance as previously discussed, and as illustrated in FIGS. 4 and 5. The circuit includes tip line 44 and ring line 46, connectors 68 and 70, POTS signal conditioning network 72, VDSL signal conditioning network 74, and premise twisted pairs 28 and 30.

In the embodiment depicted in FIG. 6, POTS signal conditioning network 72 includes common mode choke 76 and POTS low-pass filter 78. In this embodiment, POTS low-pass filter 78 is a fourth-order, or four-stage, elliptical filter that includes mutual inductors L1 and L2, and capacitors C1, C2, C3, and C4. In some embodiments, mutual inductors L1 and L2 may be in the configuration of an EP-13 core.

The incoming multi-frequency signal is received via signal lines 44a and 46a, and common mode choke 76, connected to signal lines 44a and 46a, eliminates any radio-frequency (RF) noise on the incoming signal. The windings of common mode choke 76 are connected in series with the windings of mutual inductor L1. The windings of L1 form POTS low-pass filter first stage 80. Shunting capacitor C1 is connected across the separate windings of mutual inductor L1 and second mutual inductor L2. Shunting capacitor C1 forms POTS low-pass filter second stage 82. Capacitors C2 and C3 are connected in parallel with the windings of mutual inductor L2, and the parallel combinations of L2 and capacitors C2 and C3 form POTS low-pass filter third stage 84. Shunting capacitor C4 is connected across mutual inductor L2 and signal lines 44a and 46a, forming POTS low-pass filter fourth stage 86. In other embodiments, POTS low-pass filter 78 may have fewer or more stages, depending on desired performance considerations. Finally, the filtered POTS signal is output at output port 40 and lines 48 and 50.

In another embodiment, POTS signal conditioning network 72 may include an inductor L11 (not shown in FIG. 6) on signal line 44a between POTS low-pass filter 78 and output 48, and an inductor L12 (not shown in FIG. 6) on signal line 44b between filter 78 and output 28. Inductors L11 and L12 are used to present a high impedance to any high frequencies on a phone line, for example, home phone networking signals.

In one embodiment, the component values of POTS low-pass filter 78 are selected to produce a sharp roll-off to 14.5 kHz as depicted in FIG. 4, and at the same time, match required POTS input and output impedances. In one embodiment, the impedance of POTS low-pass filter 78 matches an input impedance of 900 ohms, and an output impedance of 600 ohms.

Still referring to FIG. 6, VDSL signal conditioning network 74 includes voltage blocker 88, and VDSL high-pass filter 90 cascaded with VDSL low-pass filter 92. VDSL low-pass filter 90 is surrounded by shield 94. In one embodiment, VDSL high-pass filter 90 may be a third-order, or three-stage, elliptical filter, and VDSL low-pass filter 92 may be a seventh-order, or seven-stage, elliptical filter. The input and output impedances of VDSL signal conditioning network 74 are selected to provide a 100 ohm input and output impedance match.

In one embodiment, voltage blocker 88 is comprised of a pair of capacitors C5 and C6 on signal lines 44b and 46b, respectively. The capacitors C5 and C6 serve to block incoming POTS DC voltage from the VDSL signal.

VDSL high-pass filter 90 includes inductors L3 and L4, along with capacitors C7, C8, and C9. The series connection of inductor L3 and capacitor C7 is coupled across signal lines 44b and 46b, forming VDSL high-pass filter first stage 96. Blocking capacitors C8 and C9 are located in series in signal lines 44b and 46b, respectively, forming VDSL high-pass filter second stage 98. Inductor L4 is coupled across signal lines 44b and 46b to form VDSL high-pass filter third stage 100, completing the third-order elliptical high-pass filter.

In other embodiments, VDSL high-pass filter 90 may have fewer or more stages, depending on desired performance considerations.

VDSL low-pass filter 92 includes inductors L5 through L10, and capacitors C10 through C19, forming a seventh-order elliptical low-pass filter. In this embodiment, shunting capacitors are coupled across signal lines 44b and 46b, followed by parallel LC combinations in series with each line. More specifically, shunting capacitor C10 is coupled across signal lines 44b and 46b, followed by the parallel LC combination of L5 and C11 in signal line 44b, and the parallel combination of L6 and C12 in signal line 46b. Similarly, C13 is shunted across signal lines 44b and 46b, followed by L7 in parallel with C14 on signal line 44b and L8 in parallel with C15 on signal line 46b. C16 is shunted across signal lines 44b and 46b, followed by L9 in parallel with C17 on signal line 44b and L10 in parallel with C18 on signal line 46b. Finally, C19 is shunted across signal lines 44b and 46b.

In this embodiment, VDSL low-pass filter 92 is a seventh order filter with seven stages. C10, C13, C16, and C19 form the first, third, fifth, and seventh stages, respectively. The parallel combination of L5 and C11 along with L6 and C12 form the second stage; L7 and C14 along with L8 and C15 form the fourth stage; and L9 and C17 with L10 and C18 form the sixth stage. In other embodiments, VDSL low-pass filter 92 may have fewer or more stages, depending on desired performance considerations.

Figure 7:
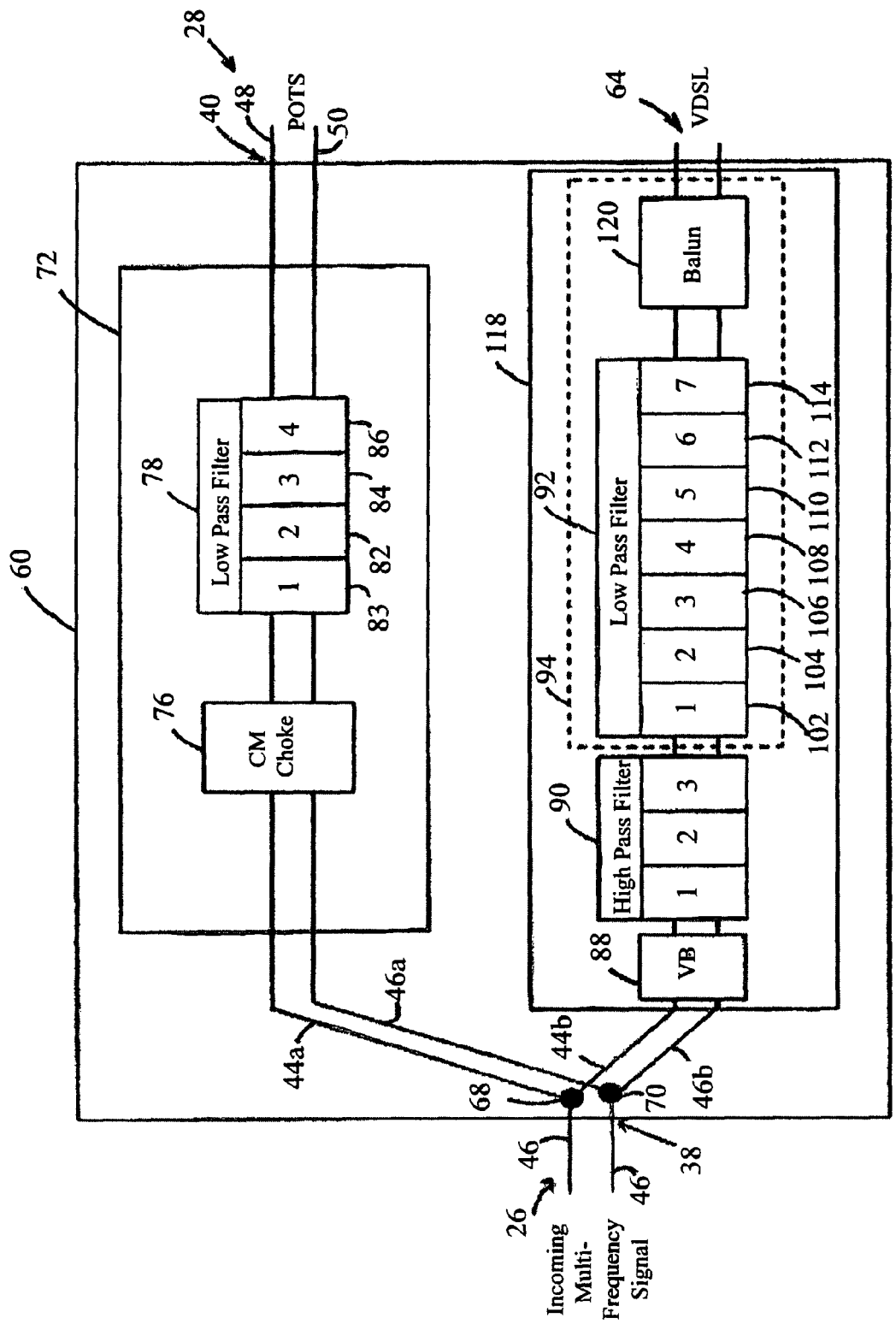
FIG. 7 is a block diagram of one embodiment of a VDSL splitter device of the present invention configured for use with coax cable at the customer premise.

Electromagnetic shield 94 may be applied over all or part of VDSL signal conditioning network 74. In one embodiment, shield 94 is applied only over VDSL low-pass filter 92. Shield 94 may be made of metal or other suitable materials known to those skilled in the art. As previously mentioned, use of shield 94 prevents ingress of unwanted interference from sources within VDSL splitter 22, as well as from outside sources Referring now to FIG. 7, in another embodiment of the present invention, a VDSL splitter 60 is adapted to output VDSL signals at output port 64 to coax cable 58 within a customer premise. VDSL splitter 60 includes substantially all the components of VDSL splitter 22, such as POTS signal conditioning network 72, voltage blocker 88, VDSL high-pass filter 90, VDSL low-pass filter 92, and shield 94. However, unlike VDSL splitter 22, VDSL signal conditioning network 118 of splitter 60 includes an impedance matching balun 120 connected to VDSL coax output port 64.

Figure 8:
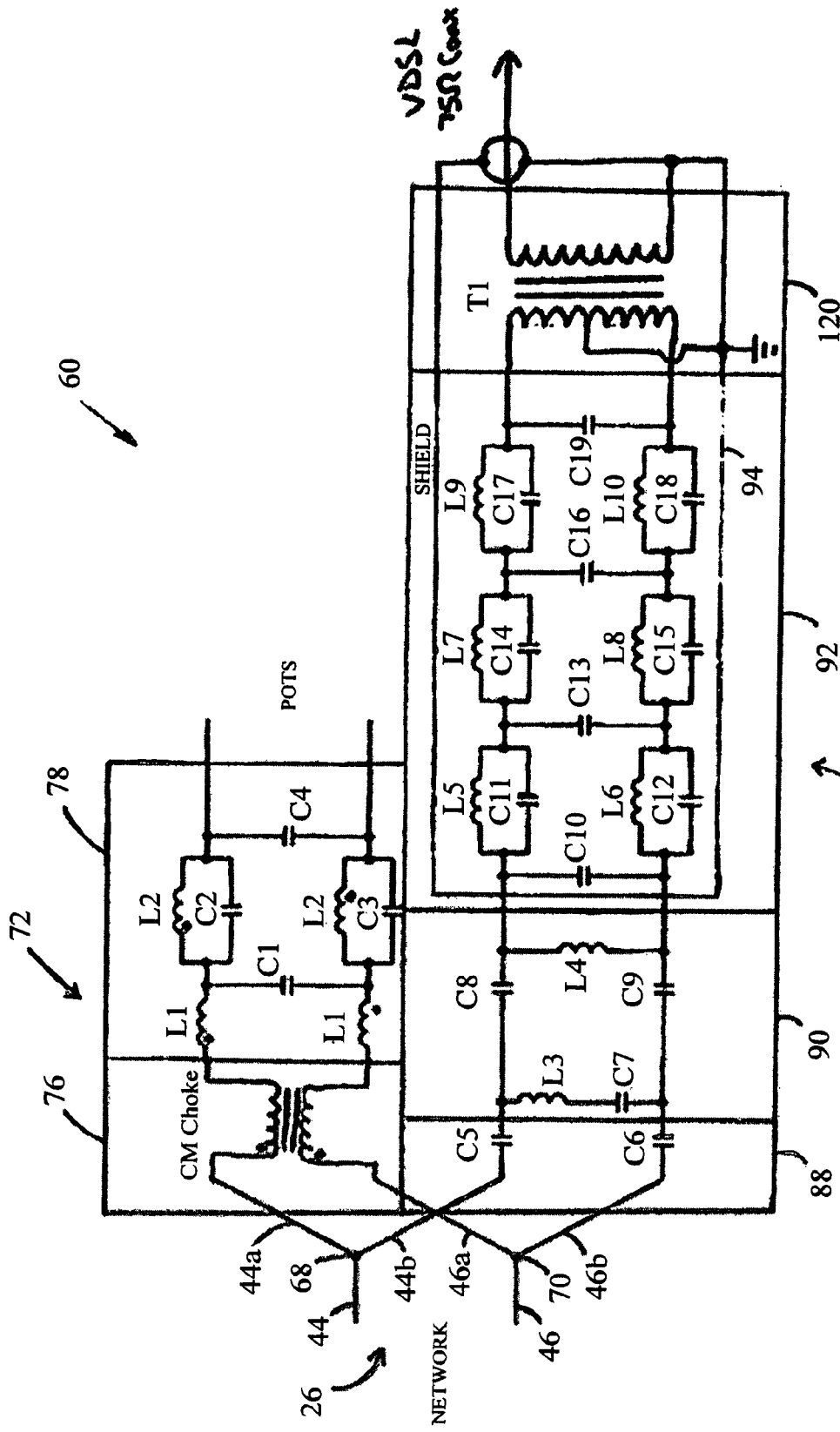
FIG. 8 is a circuit diagram of one embodiment of a VDSL splitter device of the present invention configured for use with coax cable at the customer premise.

Referring to FIG. 8, one embodiment of a circuit of VDSL splitter 60 includes the previously described POTS signal conditioning network 72, voltage blocker 88, VDSL high-pass filter 90, VDSL low-pass filter 94, and shield 94. In this embodiment, however, impedance matching balun 120 is connected to the output of VDSL low-pass filter 94 of VDSL signal conditioning network 118.

Balun 120 is appropriately wound to convert the 100 ohm balanced VDSL signal to a 75 ohm unbalanced VDSL signal for connection to coax cable 58 (see FIG. 2) at the customer premise. Balun 120 is also appropriately sized to accommodate the power transmitted through it without saturating. In the embodiment depicted in FIG. 8, balun 120 includes a center-tap connected to ground on the 100 ohm side. This increases performance by creating a common-mode shunt which will couple any unwanted common-mode noise to ground. Shield 94 may encompass both VDSL low-pass filter 92 and balun 120 as depicted.

The combination of specific frequency attenuation, shielding, and shunting of unwanted noise, results in superior circuit performance for VDSL installations. The previously described embodiment of VDSL splitter 60 yields less than 3 dB of signal loss from 25 kHz to 8.5 MHz. At the same time, VDSL splitter 60 is capable of transferring full-band VDSL signal levels of −42 dBm/Hz without saturation or distortion.

Figure 9:
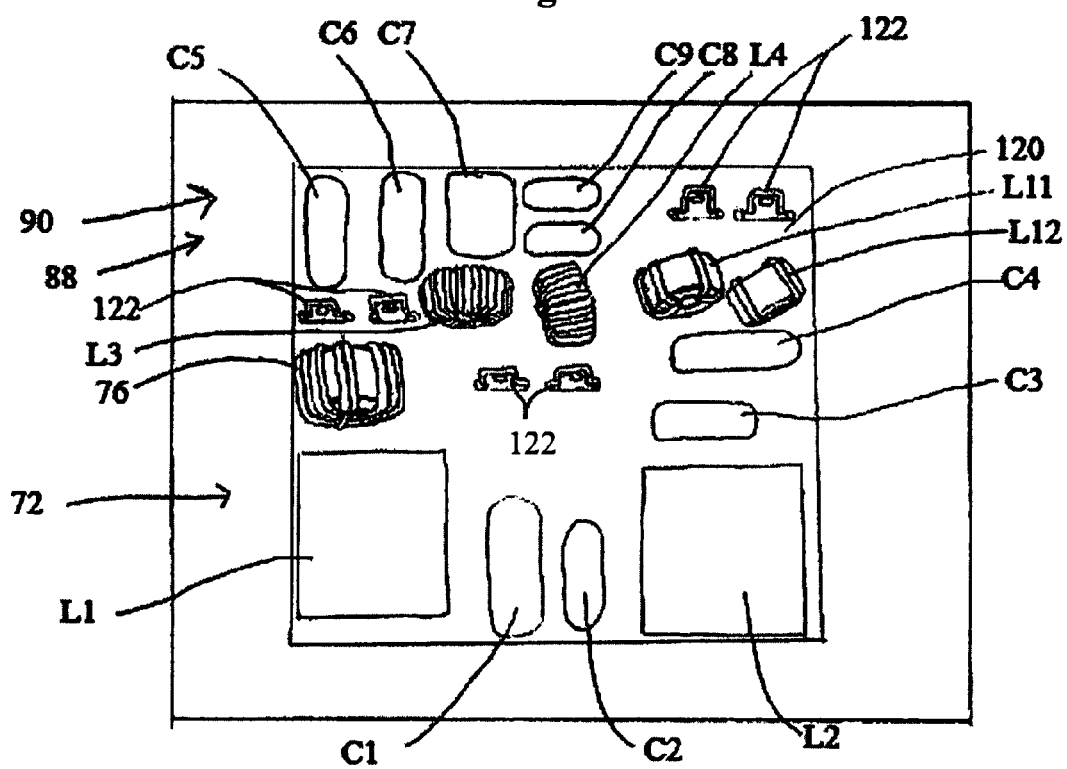
FIG. 9 is a top view of a printed circuit board with electrical components as used in the POTS signal conditioning network and the voltage blocker and VDSL high-pass filter of one embodiment of the present invention.

FIG. 9 provides a view of the various electrical components of POTS signal conditioning network 72, voltage blocker 88, and high-pass filter 90, mounted atop a single circuit board 120. Circuit board 120 also includes a number of spade terminals 122 for connecting board 120 and its components to other circuits and boards. Although in this embodiment, VDSL low-pass filter 92 is located on a separate circuit board to facilitate shielding, in other embodiments, POTS signal conditioning network and the complete VDSL signal conditioning network 74 may be located on a single circuit board.

In the embodiment depicted in FIG. 9, POTS signal conditioning network 72 components 76, L1, C1, L2, C2, C3, and C4 are generally located across the bottom of circuit board 120. Optional inductors L11 and L12 are included on board 120 as part of POTS signal conditioning network 72.

The components comprising VDSL voltage blocker 88 and VDSL high-pass filter 90, namely C5 and C6, along with L3, C7, C8, C9, and L4, are generally located across the top half of circuit board 120.

Figure 10:
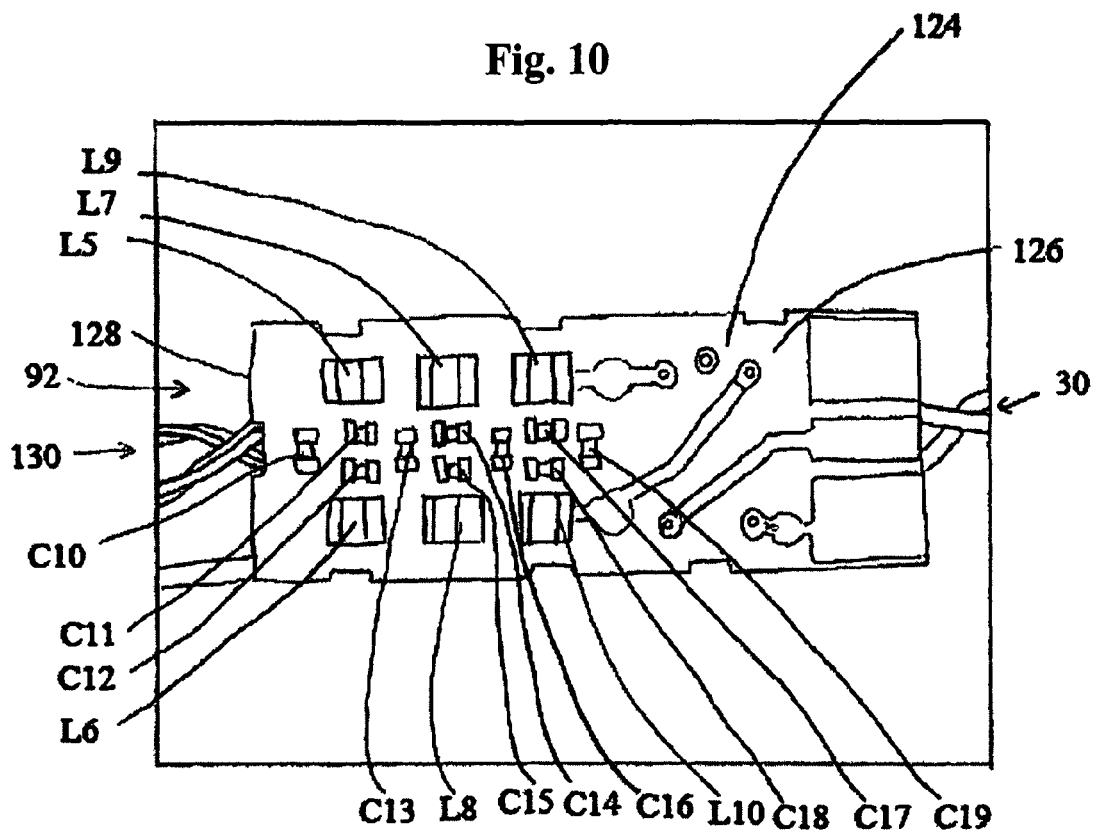
FIG. 10 is a view of a printed circuit board with electrical components as used in the VDSL low-pass filter of one embodiment of the present invention for connection to a twisted-pair VDSL network.

FIG. 10 depicts the various electrical components of VDSL low-pass filter 92 mounted to a top side 124 of a circuit board 126. In this embodiment, twisted pair of wires 130 connects VDSL high-pass filter 90 located on circuit board 120 to VDSL low-pass filter 92 located on circuit board 126. Twisted pair 30, transmitting the filtered VDSL signal, is depicted connected to bottom side 128 of circuit board 126. In this embodiment, shield 94 is not included.

Taken together as a whole, the components depicted in FIGS. 9 and 10 comprise an unshielded embodiment of VDSL splitter 22.

Figure 11:
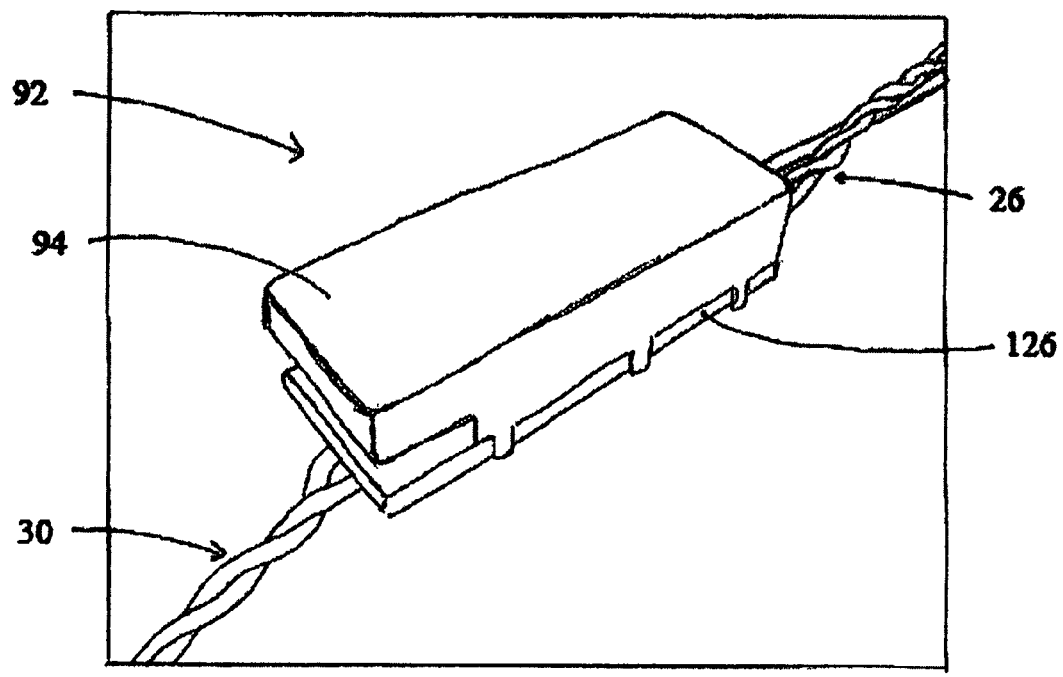
FIG. 11 is a perspective view of one embodiment of a shielded VDSL low-pass filter for connection to a twisted-pair VDSL network.

FIG. 11 depicts shield 94 applied to the components of VDSL low-pass filter 92 mounted to circuit board 126. Taken together as a whole, the components depicted in FIGS. 9 and 11 comprise a shielded embodiment of VDSL splitter 22.

Figure 12:
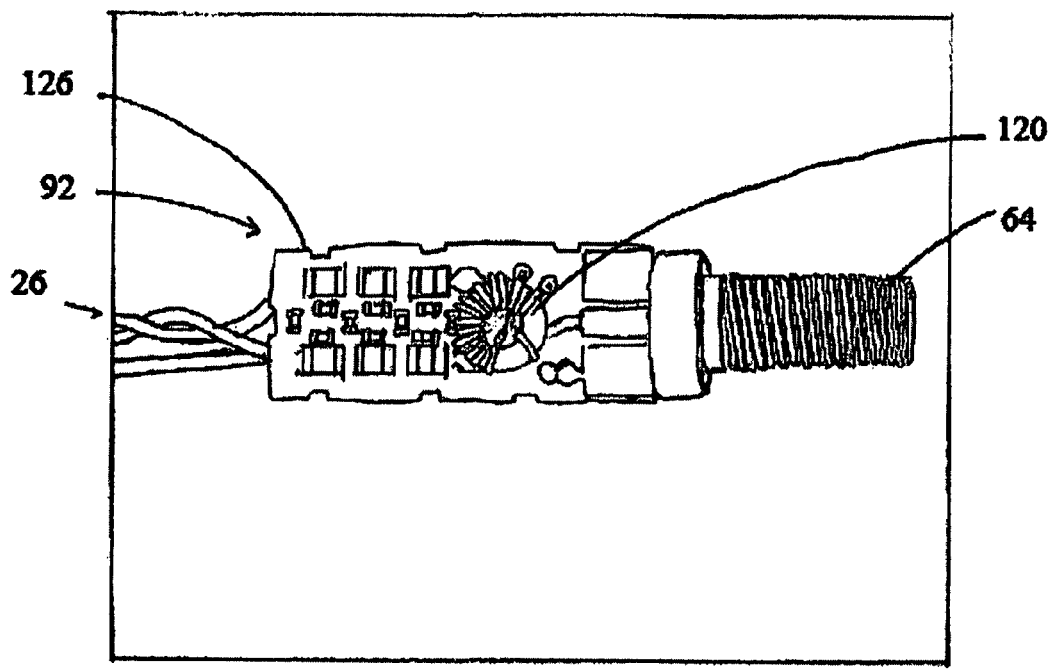
FIG. 12 is a view of a printed circuit board with electrical components as used in a VDSL low-pass filter of one embodiment of the present invention for connection to a coaxial cable.
Figure 13:
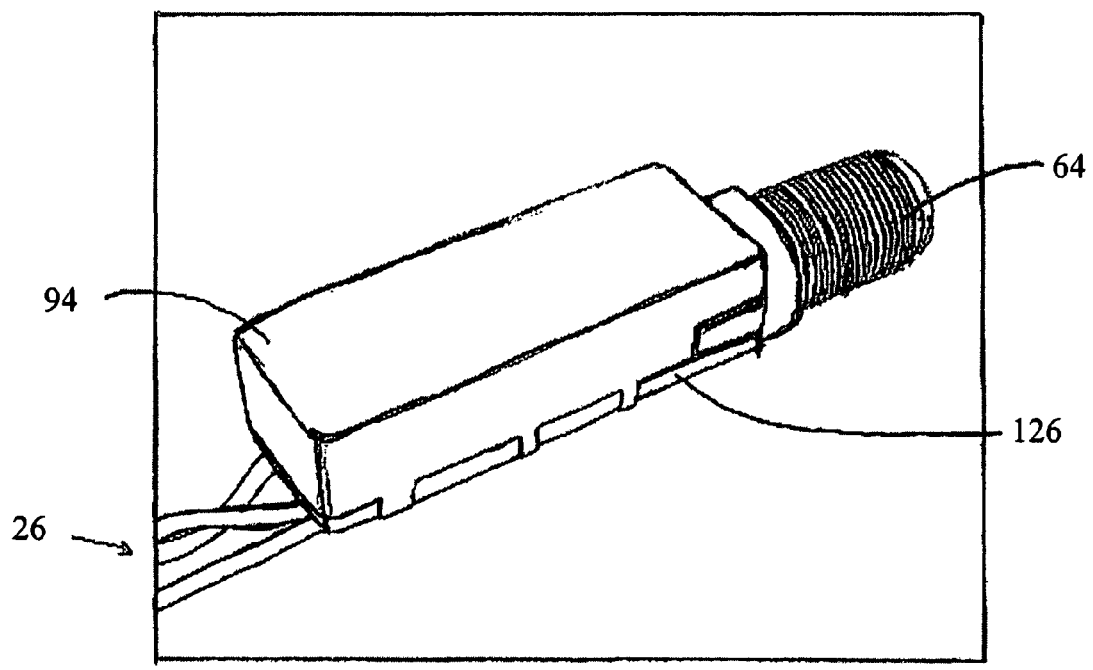
FIG. 13 is a perspective view of one embodiment of a shielded VDSL low-pass for connection to a coaxial cable.

FIG. 12 depicts the electrical components of VDSL low-pass filter 92, along with balun 120 and coax output 64, mounted to a circuit board 126. This configuration is designed for use in VDSL splitter 60, that is adapted for connection to a coax cable 58 located at a customer premise. In this embodiment, coax output 64 takes the form of an "F" connector. A shielded embodiment of this configuration is depicted in FIG. 13.

In other embodiments, the components of POTS signal conditioning network 72 and VDSL signal conditioning network 74 may be mounted to a single circuit board, or combined into circuit boards of other devices, to form additional embodiments of VDSL splitter 22 or 60.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A VDSL splitter device adapted to receive a multi-frequency signal that includes a POTS signal portion and a VDSL signal portion, and to output separate POTS and VDSL signals, comprising:
    an input port adapted to receive the multi-frequency signal;
    a POTS output port;
    a VDSL output port;
    a POTS signal conditioning network electrically connected to the input port and the POTS output port, wherein the POTS signal conditioning network comprises a POTS low-pass filter, and is adapted to receive the multi-frequency signal from the input port and output the POTS signal at the POTS output port; and
    a VDSL signal conditioning network electrically connected to the input port and the VDSL output port, wherein the VDSL signal conditioning network comprises a VDSL three-stage high-pass filter, and a voltage blocker, and is adapted to receive the multi-frequency signal from the input port and output the VDSL signal at the VDSL output port, and wherein the VDSL three-stage high-pass filter includes:
        a first stage that includes a first inductor in series with a first capacitor, wherein the series connection of the first capacitor and the first inductor is coupled across a first signal line and a second signal line;
        a second stage that includes a second capacitor connected in line with the first signal line and a third capacitor connected in line with the second signal line; and
        a third stage that includes a third inductor coupled across the first and second signal lines.

2. The VDSL splitter device of claim 1, further comprising a pair of connectors connected to the input port and adapted to route the multi-frequency signal to both the POTS signal conditioning network and to the VDSL signal conditioning network.

3. The VDSL splitter device of claim 1, wherein the input port is connected to a twisted pair of conductors that transmit the multi-frequency signal.

4. The VDSL splitter device of claim 1, wherein the POTS signal conditioning network further comprises a common-mode choke.

5. The VDSL splitter device of claim 1, wherein the POTS low-pass filter is a four-stage low-pass filter comprising:
    a first stage that includes a first mutual inductor with a first winding and a second winding;
    a second stage that includes a first capacitor, wherein the first capacitor is interposed between the first and the second windings of the first mutual inductor and between a first and second winding of a second mutual inductor;
    a third stage that includes the first winding of the second mutual inductor in parallel with a second capacitor and the second winding of the second inductor in parallel with a third capacitor, wherein the first winding of the second mutual inductor and the second capacitor are in series with the first winding of the first mutual inductor, and the second winding of the second mutual inductor and the third capacitor are in series with the second winding of the first mutual inductor; and a fourth stage that includes a capacitor coupled across the first and second windings of the second mutual inductor and across the second and third capacitors.

6. The VDSL splitter device of claim 1, wherein the voltage blocker comprises at least two capacitors.

7. The VDSL splitter device of claim 1, wherein the VDSL signal conditioning network further comprises a VDSL low-pass filter.

8. The VDSL splitter device of claim 7, wherein the VDSL high-pass filter is located between the voltage blocker and the VDSL low-pass filter.

9. The VDSL splitter device of claim 7, wherein the absolute rate of attenuation change as measured in decibels of gain per logarithmic unit of frequency between a pass band of the VDSL low-pass filter and a stop band of the VDSL low-pass filter is at least 55% greater than the absolute rate of attenuation change between a pass band of the high-pass filter and a stop band of the high-pass filter.

10. The VDSL splitter device of claim 7 further comprising a shield over the VDSL low-pass filter.

11. The VDSL splitter device of claim 7, wherein the VDSL low pass filter is a seven-stage low-pass filter comprising:
   a first stage that includes a first capacitor coupled across a first signal line and a second signal line;
   a second stage that includes a first inductor in parallel with a second capacitor and a second inductor in parallel with a third capacitor, wherein the first inductor and second capacitor are connected in line with the first signal line, and the second inductor and third capacitor are connected in line with the second signal line;
   a third stage that includes a fourth capacitor coupled across the first signal line and the second signal line;
   a fourth stage that includes a third inductor in parallel with a fifth capacitor and a fourth inductor in parallel with a sixth capacitor, wherein the third inductor and fifth capacitor are connected in line with the first signal line, and the fourth inductor and sixth capacitor are connected in line with the second signal line;
   a fifth stage that includes a seventh capacitor coupled across the first signal line and the second signal line;
   a sixth stage that includes a fifth inductor in parallel with an eighth capacitor and a sixth inductor in parallel with a ninth capacitor, wherein the fifth inductor and eighth capacitor are connected in line with the first signal line, and the sixth inductor and ninth capacitor are connected in line with the second signal line; and
   a seventh stage that includes a tenth capacitor coupled across the first signal line and the second signal line.

12. The VDSL splitter device of claim 1, wherein the VDSL signal conditioning network further comprises a balun.

13. The VDSL splitter device of claim 12, wherein a portion of a winding on the balun is shunted to ground forming a common mode shunt.

14. The VDSL splitter device of claim 12, wherein the output port is adapted to connect to a coaxial cable.

15. The VDSL splitter device of claim 1 adapted to fit into a NID enclosure.

16. A method of separating a multi-frequency signal containing a POTS signal portion and a VDSL signal portion into separate POTS and VDSL signals, comprising:
   receiving the multi-frequency signal at a VDSL splitter device;
   tapping the multi-frequency signal into a first multi-frequency signal and a second multi-frequency signal, wherein the first and second multi-frequency signals are substantially the same;
   routing the first multi-frequency signal to a POTS signal conditioning network;
   passing the first multi-frequency signal through a common-mode choke of the POTS signal conditioning network to remove a radio-frequency portion of the first multi-frequency signal;
   attenuating the VDSL signal portion of the first multi-frequency signal by passing the first multi-frequency signal through a low-pass filter of the POTS signal conditioning network;
   outputting a POTS signal at an output port of the VDSL splitter device;
   routing the second multi-frequency signal to a VDSL signal conditioning network;
   passing the second multi-frequency signal through a voltage blocker of the VDSL signal conditioning network to eliminate a DC portion of the second multi-frequency signal; and
   passing the second multi-frequency signal through a high-pass filter of the VDSL signal conditioning network after passing the second multi-frequency signal through the voltage blocker, thereby attenuating a low-frequency portion of the second multi-frequency signal, wherein the high-pass filter comprises a three-stage high-pass filter that includes:
      a first stage that includes a first inductor in series with a first capacitor, wherein the series connection of the first capacitor and the first inductor is coupled across a first signal line and a second signal line;
      a second stage that includes a second capacitor connected in line with the first signal line and a third capacitor connected in line with the second signal line; and
      a third stage that includes a third inductor coupled across the first and second signal lines;
   passing the second multi-frequency signal through a low-pass filter of the VDSL signal conditioning network after passing the second multi-frequency signal through the high-pass filter, thereby attenuating a high-pass portion of the second multi-frequency signal; and
   outputting a VDSL signal at the output port of the VDSL splitter.

17. The method of claim 16 further comprising:
   transmitting the second multi-frequency signal through a balun prior to outputting the VDSL signal.

18. A system for distributing combined POTS and VDSL signals comprising:
   telephone network wiring;
   a central office that combines separate POTS and VDSL signals into a single multi-frequency signal for distribution over the telephone network wiring;
   a VDSL splitter device for receiving the multi-frequency signal and separating the multi-frequency signal into separate POTS and VDSL signals, the VDSL splitter being operably connected to the telephone network wiring, located at a customer premise, and including a POTS signal conditioning network and a VDSL signal conditioning network, wherein the VDSL signal conditioning network comprises a DC voltage blocker and a multi-stage VDSL high-pass filter, the multi-stage VDSL high-pass filter comprising a three-stage high-pass filter that includes:

a first stage that includes a first inductor in series with a first capacitor, wherein the series connection of the first capacitor and the first inductor is coupled across a first signal line and a second signal line;

a second stage that includes a second capacitor connected in line with the first signal line and a third capacitor connected in line with the second signal line; and a third stage that includes a third inductor coupled across the first and second signal lines;

a customer premise POTS wiring network for receiving the POTS signal from the VDSL splitter and distributing the POTS signal to devices located at the customer premise; and a VDSL customer premise wiring network for receiving the VDSL signal from the VDSL splitter and distributing the VDSL signal to devices located at the customer premise.

19. The system of claim 18, wherein the VDSL signal conditioning network further comprises a VDSL low-pass filter and the POTS signal conditioning network comprises a common-made choke and a multi-stage low-pass filter.

20. The system of claim 18, wherein the VDSL customer premise wiring network comprises coaxial cable.

21. The system of claim 18, wherein the VDSL splitter device is located in a network interface device (NID) enclosure at the customer premise.

22. The system of claim 18, wherein the VDSL splitter device is located within a wall of a building at the customer premise.

23. A VDSL splitter device, connected to a pair of telephone network conductors, for receiving a multi-frequency signal that includes a low-frequency POTS signal portion and a high-frequency VDSL signal portion, and separating the multi-frequency signal into individual low-frequency POTS and high-frequency VDSL signals, comprising:

an input port adapted to receive the multi-frequency signal;

a POTS signal conditioning network electrically connected to the input port, wherein the POTS signal conditioning network is adapted to receive the multi-frequency signal from the input port and output the low-frequency POTS signal; and a VDSL signal conditioning network electrically connected to the input port, wherein the VDSL signal conditioning network comprises a voltage blocker, a VDSL high-pass filter, and a VDSL low-pass filter, and is adapted to receive the multi-frequency signal from the input port and output the high-frequency VDSL signal, and wherein the VDSL high-pass filter comprises a three-stage high-pass filter that includes:

a first stage that includes a first inductor in series with a first capacitor, wherein the series connection of the first capacitor and the first inductor is coupled across a first signal line and a second signal line;

a second stage that includes a second capacitor connected in line with the first signal line and a third capacitor connected in line with the second signal line; and a third stage that includes a third inductor coupled across the first and second signal lines.

24. A VDSL signal conditioning network for receiving a multi-frequency signal containing a low-frequency POTS signal portion and a high-frequency VDSL signal portion, removing the low-frequency POTS signal portion, and outputting substantially all of the high-frequency VDSL signal portion, comprising:

a voltage blocker for receiving the multi-frequency signal and blocking a DC component of the low-frequency POTS signal portion;

a multi-stage high-pass filter for removing low-frequency components of the low-frequency POTS signal, the multi-stage high-pass filter comprising a three-stage high-pass filter that includes:

a first stage that includes a first inductor in series with a first capacitor, wherein the series connection of the first capacitor and the first inductor is coupled across a first signal line and a second signal line;

a second stage that includes a second capacitor connected in line with the first signal line and a third capacitor connected in line with the second signal line; and a third stage that includes a third inductor coupled across the first and second signal lines;

a multi-stage low-pass filter for removing selected high-frequency portions of the multi-frequency signal;

and wherein the voltage blocker, multi-stage high-pass filter, and multi-stage low-pass filter are connected electrically in series, and the voltage blocker is located before the multi-stage high-pass filter.

25. The VDSL splitter device of claim 1, wherein the voltage blocker is located between the input port and the VDSL high-pass filter.

26. A VDSL splitter device adapted to receive a multi-frequency signal that includes a POTS signal portion and a VDSL signal portion, and to output separate POTS and VDSL signals, comprising:

a POTS signal conditioning network adapted to receive a multi-frequency signal that includes a POTS signal portion and a VDSL signal portion and to substantially output the POTS signal portion, wherein the POTS signal conditioning network comprises a POTS four-stage low-pass filter that includes:

a first stage that includes a first mutual inductor with a first winding and a second winding;

a second stage that includes a first capacitor, wherein the first capacitor is interposed between the first and the second windings of the first mutual inductor and between a first and second winding of a second mutual inductor;

a third stage that includes the first winding of the second mutual inductor in parallel with a second capacitor and the second winding of the second inductor in parallel with a third capacitor, wherein the first winding of the second mutual inductor and the second capacitor are in series with the first winding of the first mutual inductor, and the second winding of the second mutual inductor and the third capacitor are in series with the second winding of the first mutual inductor; and a fourth stage that includes a capacitor coupled across the first and second windings of the second mutual inductor and across the second and third capacitors; and a VDSL signal conditioning network adapted to receive the multi-frequency signal that includes the POTS signal portion and the VDSL signal portion and to substantially output the VDSL signal portion, wherein the VDSL signal conditioning network comprises a voltage blocker and a low-pass filter.

27. The VDSL splitter device of claim 26, wherein the voltage blocker includes a first capacitor and a second capacitor.

28. The VDSL splitter device of claim 27, wherein the first capacitor is electrically coupled in series with a first signal line of the VDSL signal conditioning network, and the second capacitor is electrically coupled in series with a second signal line of the VDSL signal conditioning network.

29. The VDSL splitter device of claim 26, wherein the voltage blocker is directly electrically coupled to the VDSL low-pass filter.

30. The VDSL splitter device of claim 29, wherein the voltage blocker is indirectly electrically coupled to the input port and the VDSL low-pass filter.

31. The VDSL splitter device of claim 26, wherein the VDSL signal conditioning network further comprises a VDSL high-pass filter.

32. The VDSL splitter device of claim 31, wherein the VDSL high-pass filter is a three-stage filter.

33. A VDSL splitter device adapted to receive a multi-frequency signal that includes a POTS signal portion and a VDSL signal portion, and to output separate POTS and VDSL signals, comprising:
   an input port adapted to receive the multi-frequency signal;
   a POTS output port;
   a VDSL output port;
   a POTS signal conditioning network electrically connected to the input port and the POTS output port, wherein the POTS signal conditioning network comprises a POTS low-pass filter, and is adapted to receive the multi-frequency signal from the input port and output the POTS signal at the POTS output port; and
   a VDSL signal conditioning network electrically connected to the input port and the VDSL output port, wherein the VDSL signal conditioning network comprises a first VDSL filter and a second VDSL filter, and is adapted to receive the multi-frequency signal from the input port and output the VDSL signal at the VDSL output port, and wherein the first VDSL filter comprises a three-stage high-pass filter that includes:
      a first stage that includes a first inductor in series with a first capacitor, wherein the series connection of the first capacitor and the first inductor is coupled across a first signal line and a second signal line;
      a second stage that includes a second capacitor connected in line with the first signal line and a third capacitor connected in line with the second signal line; and
      a third stage that includes a third inductor coupled across the first and second signal lines.

34. The VDSL splitter device of claim 33, wherein the first VDSL filter comprises a first blocking capacitor and a second blocking capacitor.

35. The VDSL splitter of claim 33, wherein the low-pass filter is a seven-stage filter.

36. The VDSL splitter device of claim 35, wherein the VDSL filter is adapted to block DC voltage.

37. The VDSL splitter device of claim 33, wherein the first VDSL filter further comprises a voltage blocker and the second VDSL filter further comprises a common-mode choke.

38. A method of separating a multi-frequency signal containing a POTS signal portion and a VDSL signal portion into separate POTS and VDSL signals, comprising:
   receiving the multi-frequency signal at a VDSL splitter device;
   tapping the multi-frequency signal into a first multi-frequency signal and a second multi-frequency signal, wherein the first and second multi-frequency signals are substantially the same;
   routing the first multi-frequency signal to a POTS signal conditioning network;
   attenuating the VDSL signal portion of the first multi-frequency signal by passing the first multi-frequency signal through a low-pass filter of the POTS signal conditioning network;
   outputting a POTS signal at an output port of the VDSL splitter device;
   routing the second multi-frequency signal to a VDSL signal conditioning network;
   passing the second multi-frequency signal through a first filter of the VDSL signal conditioning network to substantially eliminate a DC portion of the second multi-frequency signal;
   passing the second multi-frequency signal through a second filter of the VDSL signal conditioning network, the second filter comprising a three-stage high-pass filter that includes:
      a first stage that includes a first inductor in series with a first capacitor, wherein the series connection of the first capacitor and the first inductor is coupled across a first signal line and a second signal line;
      a second stage that includes a second capacitor connected in line with the first signal line and a third capacitor connected in line with the second signal line; and
      a third stage that includes a third inductor coupled across the first and second signal lines; and
   outputting a VDSL signal at the output port of the VDSL splitter.

39. The method of claim 38, further comprising passing the second multi-frequency signal through a a low-pass filter, a common-mode choke, balun, or any combination thereof, of the VDSL signal conditioning network.

40. A VDSL splitter device adapted to receive a multi-frequency signal that includes a POTS signal portion and a VDSL signal portion, and to output separate POTS and VDSL signals, comprising:
   an input port adapted to receive the multi-frequency signal;
   a POTS output port;
   a VDSL output port;
   a POTS signal conditioning network electrically connected to the input port and the POTS output port, wherein the POTS signal conditioning network comprises a four-stage POTS low-pass filter, and is adapted to receive the multi-frequency signal from the input port and output the POTS signal at the POTS output port, the four-stage POTS low-pass filter including:
      a first stage that includes a first mutual inductor with a first winding and a second winding;
      a second stage that includes a first capacitor, wherein the first capacitor is interposed between the first and the second windings of the first mutual inductor and between a first and second winding of a second mutual inductor;
      a third stage that includes the first winding of the second mutual inductor in parallel with a second capacitor and the second winding of the second inductor in parallel with a third capacitor, wherein the first winding of the second mutual inductor and the second capacitor are in series with the first winding of the first mutual inductor, and the second winding of the second mutual inductor and the third capacitor are in series with the second winding of the first mutual inductor; and a fourth stage that includes a capacitor coupled across the first and second windings of the second mutual inductor and across the second and third capacitors; and a VDSL signal conditioning network electrically connected to the input port and the VDSL output port, wherein the VDSL signal conditioning network comprises a VDSL high-pass filter, and a voltage blocker, and wherein the VDSL signal conditioning network is adapted to receive the multi-frequency signal from the input port and output the VDSL signal at the VDSL output port.

41. A VDSL splitter device adapted to receive a multi-frequency signal that includes a POTS signal portion and a VDSL signal portion, and to output separate POTS and VDSL signals, comprising:

an input port adapted to receive the multi-frequency signal;

a POTS output port;

a VDSL output port;

a POTS signal conditioning network electrically connected to the input port and the POTS output port, wherein the POTS signal conditioning network comprises a POTS low-pass filter, and is adapted to receive the multi-frequency signal from the input port and output the POTS signal at the POTS output port; and a VDSL signal conditioning network electrically connected to the input port and the VDSL output port, wherein the VDSL signal conditioning network includes a VDSL high-pass filter, a VDSL seven-stage low-pass filter, and a voltage blocker, and is adapted to receive the multi-frequency signal from the input port and output the VDSL signal at the VDSL output port, and wherein the VDSL seven-stage low-pass filter comprises:

a first stage that includes a first capacitor coupled across a first signal line and a second signal line;

a second stage that includes a first inductor in parallel with a second capacitor and a second inductor in parallel with a third capacitor, wherein the first inductor and second capacitor are connected in line with the first signal line, and the second inductor and third capacitor are connected in line with the second signal line;

a third stage that includes a fourth capacitor coupled across the first signal line and the second signal line;

a fourth stage that includes a third inductor in parallel with a fifth capacitor and a fourth inductor in parallel with a sixth capacitor, wherein the third inductor and fifth capacitor are connected in line with the first signal line, and the fourth inductor and sixth capacitor are connected in line with the second signal line;

a fifth stage that includes a seventh capacitor coupled across the first signal line and the second signal line;

a sixth stage that includes a fifth inductor in parallel with an eighth capacitor and a sixth inductor in parallel with a ninth capacitor, wherein the fifth inductor and eighth capacitor are connected in line with the first signal line, and the sixth inductor and ninth capacitor are connected in line with the second signal line; and a seventh stage that includes a tenth capacitor coupled across the first signal line and the second signal line.

42. A VDSL splitter device adapted to receive a multi-frequency signal that includes a POTS signal portion and a VDSL signal portion, and to output separate POTS and VDSL signals, comprising:

a POTS signal conditioning network adapted to receive a multi-frequency signal that includes a POTS signal portion and a VDSL signal portion and to substantially output the POTS signal portion, wherein the POTS signal conditioning network comprises a POTS low-pass filter; and a VDSL signal conditioning network adapted to receive the multi-frequency signal that includes the POTS signal portion and the VDSL signal portion and to substantially output the VDSL signal portion, wherein the VDSL signal conditioning network comprises a voltage blocker and a seven-stage low-pass filter, the seven-stage low-pass filter including:

a first stage that includes a first capacitor coupled across a first signal line and a second signal line;

a second stage that includes a first inductor in parallel with a second capacitor and a second inductor in parallel with a third capacitor, wherein the first inductor and second capacitor are connected in line with the first signal line, and the second inductor and third capacitor are connected in line with the second signal line;

a third stage that includes a fourth capacitor coupled across the first signal line and the second signal line;

a fourth stage that includes a third inductor in parallel with a fifth capacitor and a fourth inductor in parallel with a sixth capacitor, wherein the third inductor and fifth capacitor are connected in line with the first signal line, and the fourth inductor and sixth capacitor are connected in line with the second signal line;

a fifth stage that includes a seventh capacitor coupled across the first signal line and the second signal line;

a sixth stage that includes a fifth inductor in parallel with an eighth capacitor and a sixth inductor in parallel with a ninth capacitor, wherein the fifth inductor and eighth capacitor are connected in line with the first signal line, and the sixth inductor and ninth capacitor are connected in line with the second signal line; and a seventh stage that includes a tenth capacitor coupled across the first signal line and the second signal line.

\* \* \* \* \*

UNITED STATES PATENT AND TRADEMARK OFFICE
CERTIFICATE OF CORRECTION

| | | |
|---|---|---|
| PATENT NO. | : 8,005,206 B1 | Page 1 of 1 |
| APPLICATION NO. | : 11/691441 | |
| DATED | : August 23, 2011 | |
| INVENTOR(S) | : Nathan G. Doose and John E. DeCramer | |

It is certified that error appears in the above-identified patent and that said Letters Patent is hereby corrected as shown below:

Col. 2, line 3, delete "slimmed" and insert --shunned--

Col. 2, line 6, after "able", insert --to--

Col. 13, line 22, delete "made" and insert --mode--

Signed and Sealed this
Twenty-third Day of October, 2012

David J. Kappos
*Director of the United States Patent and Trademark Office*